Figure 1:
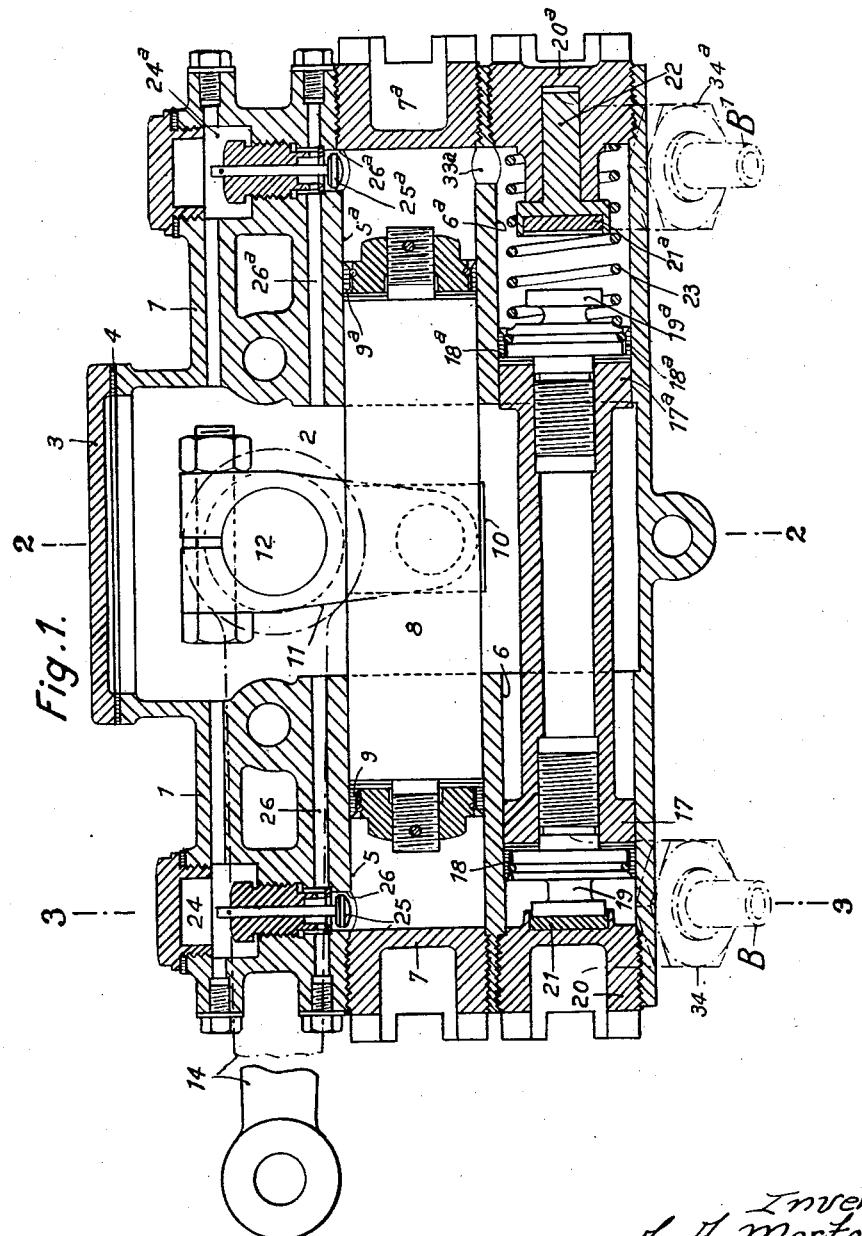

March 14, 1944. A. A. MORTON 2,344,050
HYDRAULIC DAMPING AND STABILIZING DEVICE
Filed June 5, 1941 2 Sheets-Sheet 1

Inventor,
A. A. Morton
By: Glascock Downing & Seebold
Attys.

March 14, 1944.  A. A. MORTON  2,344,050
HYDRAULIC DAMPING AND STABILIZING DEVICE
Filed June 5, 1941  2 Sheets-Sheet 2
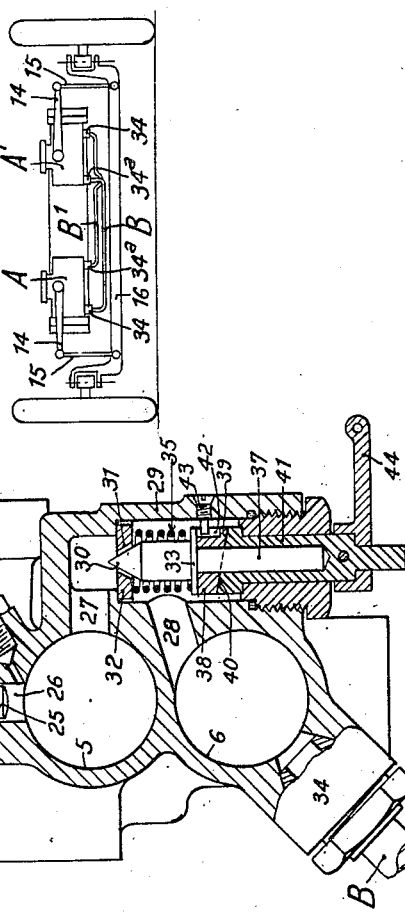
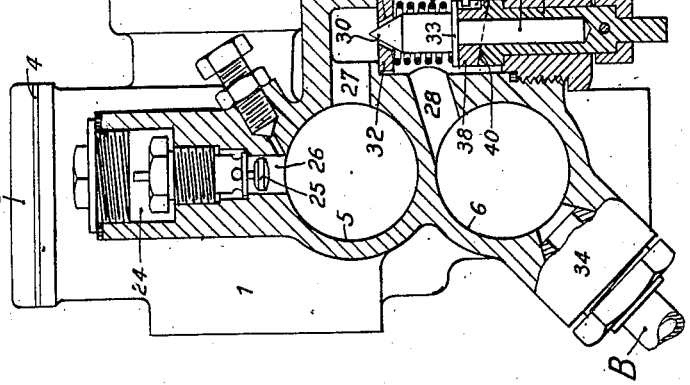
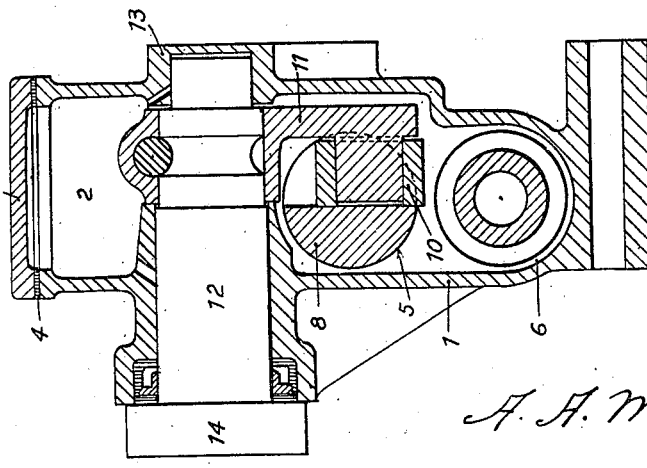
Inventor,
A. A. Morton
By Glascock Downing & Seebold
Attys.

Patented Mar. 14, 1944

2,344,050

UNITED STATES PATENT OFFICE 2,344,050

HYDRAULIC DAMPING AND STABILIZING DEVICE

André Adolphe Morton, Paris, France; vested in the Alien Property Custodian

Application June 5, 1941, Serial No. 396,778
In France May 9, 1940

3 Claims. (Cl. 267—11)

In the French Patent 855,043, filed January 17, 1939, by Paul Henry Mistral, is described a suspension gear for motor vehicles, in which between the suspended and nonsuspended part of the vehicle are arranged two pairs of hydraulic devices located respectively at the front and rear of the vehicle and hydraulically connected to one another, in each pair, by crossed pipings so that the motion of the movable part of one device sets up a movement of the same amount and in the same direction of the movable part of the other device.

This system acts as a stabilizing and damping device for the suspension and comprises:

(a) A device compensating the expansions and contractions of the liquid, and (b) An adjustable valve for the damping, which sets up a parallel adjustment of the suspension and damping.

During tests made after connection of maximum recording pressure gauges on the various pipings, the following facts have been observed:

1. The pressures involved in the stabilizing action are considerably lower than those occurring during damping, 2. The damping pressures are much lower at high speed than at low speed, viz., of the order of 350 kg./sq. cm. at 80 km./hr. against 600 kg./sq. cm. at 40 km./hr., and 3. The stabilization of small oscillations is highly straining for the vehicle frame now used on the majority of cars.

From these facts it may be deduced that there is a certain interest in not stabilizing small oscillations, but only damping them out, the limit between these two operations may be adjusted differently for the fore and aft of the vehicle, i. e., with respect to the position of the mass centre on the longitudinal axis of said vehicle.

The object of the present invention is a damping and stabilizing device adapted to fulfill the above conditions and, for the purpose of illustration, an embodiment of the apparatus according to the invention will be described below, by way of example, with reference to the joined drawings, in which:

Figure 1 shows in the rest position the damping and stabilizing device according to the invention, in longitudinal vertical section along the axis, Figures 2 and 3 are vertical transverse sections respectively along the lines 2—2 and 3—3 of Figure 1, and Figure 4 shows diagrammatically and at a smaller scale the front of a motor vehicle fitted with two hydraulic devices of the same construction as that shown in Figures 1 to 3.

As shown in Figure 4, the damping and stabilizing device according to the invention, adapted to be fitted either to the front wheels, as shown, or to the back wheels of a motor vehicle, comprises two similar hydraulic devices A and A₁, connected to one another as explained below, by two transverse pipes B, B₁, while suitable connecting rods connect the movable part of the devices to the nonsuspended part of the vehicle.

In Figures 1 to 3 each hydraulic device comprises a body 1 comprising in its central part a chamber 2 constituting an oil reserve tank and closed hermetically at its upper part by a lid 3 with a gasket 4.

This hollow body further comprises two circular bores of the same or different diameters, divided each by chamber 2 into spaced portions constituting two cylinders referred to respectively as 5, 5a for the upper, and 6, 6a for the lower.

Inside the cylinders 5, 5a, closed, at their ends, by plugs 7 and 7a, is mounted slidably in both directions a piston 8 which may be provided in addition, as shown, with sealing devices such as leather cups 9, 9a.

In the example shown, the piston 8 is connected, by a block 10, to a lever arm 11 keyed to a shaft 12 rotatable in the bearings 13 of the hollow body 1 and carrying an outer lever 14 connected by a connecting rod 15 or any other suitable part, to the axle 16, as shown in Figure 4.

The movements of piston 8 are thus controlled by the oscillations impressed to the axle 16 during the travel of the vehicle, the piston moving at the same time as the axle or the part replacing the latter in the case of independent wheels.

In the lower cylinders 6, 6a is movable a second piston 17, 17a, provided at its ends with packings such as leather cups 18, 18a, and comprising stops 19, 19a. These two cylinders 6, 6a are closed respectively by plugs 20, 20a, the first of which carries a stop stud 21 of a non-sound-producing substance, and the second a stop 22 provided with a similar stop stud 21a.

The piston 17, 17a is brought into contact with the stud 21, as shown in Figure 1, by a spring 23, the tension of which is such that it may only overcome the sliding resistance of said piston in the cylinders 6, 6a during the idle periods of piston 8, that is to say, when the vehicle is stopped or when it is not subjected to oscillations during its travel.

At rest, with the piston 17, 17a in each of the two apparatus A, A₁ located at the front and rear of the vehicle in contact with the stud 21 by the stop 19, as shown in Figure 1, the interval between the stop 19a and stud 21a forms a space adjusting, as explained below, the range of damping without stabilization, and to which a suitable length is to be given for the front and rear of the vehicle.

The hollow body 1 comprises, at its upper part, two boxes 24 and 24a in which are located respectively two valves 25 and 25a which, during the idle periods of piston 8 and during the stops of the vehicle, are normally maintained by their weight in the open position as shown in Figure 1, and set up communication between the oil reserve tank 2 and the cylinders 5, 5a over channels 26, 26a and the valve seats 25, 25a.

Cylinder 5 further communicates, as seen in Figure 3, with cylinder 6 by means of two channels 27, 28 leading, the first, into the upper part, and the second into the lower part of a box 29 inside which is arranged a needle valve 30 adapted to be moved vertically and to penetrate more or less into the central conical aperture 31 of a washer 32 in order to adjust the cross-section of the annular passage formed between said aperture 31 and the point of the needle valve, and setting into communication with one another the two channels 27, 28 and, consequently, both cylinders 5 and 6.

The two cylinders 5a and 6a are constantly in communication with one another by means of a channel 33a drilled into the wall common to both cylinders, as seen in Figure 1.

The two lower cylinders 6, 6a of each of the two apparatus A, A1 in Figure 4 are provided with two nipples 34, 34a arranged respectively to one another as shown in Figure 4, and to which are connected two pipes B, B1 connecting both apparatus A, A1 of the front or rear of the vehicle in such a manner that the nipple 34 of the left apparatus A be connected to nipple 34a of the right apparatus A1, while nipple 34 of the right apparatus A1 is connected to nipple 34a of the left apparatus A.

Due to this arrangement, the central oil reserve tank 2 of each device A, A1 communicates with the bores or cylinders 5, 5a which communicate with the bores or cylinders 6, 6a, so that all these cylinders and both crossed pipes B, B1 connecting the two devices A, A1, as described above, are filled with oil.

Each of the valves 25, 25a is meant to compensate the expansions and contractions of the liquid under the effect of variations of the outer temperature or of the temperature of the liquid, and is only applied against its seat when an overpressure is set up in the circuit of said liquid by the displacements impressed on piston 8 by the oscillations transmitted to the vehicle by road bumps.

The needle 30 interposed between the bores or cylinders 5 and 6 of each device A, A1, controlling the communication between them, is inserted, as explained above, in the central conical aperture 31 of a washer 32 which, under normal conditions, is maintained applied against an inner flange of box 29 by a light spring 35 inserted between said washer 32 and a collar 33 integral with the needle.

The stem 37 of needle 30 carries, fixed to the latter below the collar 33, a ring 38, the lower base of which forms a helical ramp 39 maintained in contact by a spring 35 with another helical ramp 40 formed at the upper end of a vertical hollow shaft 41 rotating inside the body of box 29 and in the central bore of which the stem 37 of the needle is mounted vertically slidable and maintained against any angular displacement by the ring 38 in a vertical groove 42 of which is freely engaged a screw 43 fixed in the box 29.

For giving the needle 30 the required vertical displacements and thus varying the cross section of the annular passage formed between said needle and the central aperture 31 of the washer 32, as explained, the shaft 41 carrying the helical ramp 40 is connected, by means of a crank 44 keyed to said shaft, to a suitable control device allowing the driver of the vehicle to give from a distance to said shaft 41 angular displacements of the required direction and amplitude for obtaining, by means of the helical ramps 40 and 39 a lift or a downward motion of the needle 30 and for permitting, as will be explained, a damping of the small oscillations, and combined damping and stabilization of oscillations of larger amplitude.

The operation of the apparatus described above is as follows:

When, owing to road bumps, piston 8, Figure 1, is moved in cylinder 5 towards the left of this figure, the liquid, carried along in this movement, first closes the valve 25 and is then discharged through the channel 27 into box 29 of valve 31, and through channel 28 into cylinder 6. Since piston 17 is subjected only to the light resistance of spring 23, it will be pushed towards the right, thereby discharging into cylinder 6a, under the push of piston 17a integral with 17, an amount of liquid equal to that entered into cylinder 6. This liquid will enter, through channel 33a, into cylinder 6a and thus fill the space cleared in cylinder 5a by the motion of piston 8 towards the left.

If the movement of piston 8 is only small, it may happen that piston 17, 17a be moved to the right only by an amount equal at most to the distance separating the stop 19a from the stud 21a; in this case, the device will operate only on one side of the vehicle.

Upon return of piston 8 towards the right, i. e., after the road hump has been passed, the liquid is delivered by said piston of cylinder 5a into cylinder 6a, piston 17a moves, in turn, towards the left and piston 17 integral with 17a discharges an equal amount of liquid into cylinder 5 over valve 30 which produces the damping effect for which it has been adjusted.

If, on the contrary, piston 8 is moved by a large amount towards the left, it will discharge, first into cylinder 6, an amount of liquid equal to the maximum permitted by the space separating the stop 19a from stud 21a; piston 17, 17a is thus moved to the right of Figure 1 and stopped, at the end of its stroke, by the abutment of stop 19a against stud 21a, so that the excess of liquid discharged by piston 8 in succession into cylinder 5 and cylinder 6 will escape from the latter through nipple 34, Figures 1, 3 and 4, and be discharged from said cylinder 6 of one of the apparatus, A for instance, Figure 4, into the corresponding cylinder 6a of apparatus A1, through the pipe B and nipple 34a as seen in Figure 4.

With the piston 17 of this second apparatus A1 locked by its stop 19 which is in contact with stud 21, the liquid then passes through channel 33a into cylinder 5a of said apparatus A1, thereby repelling piston 8, which, by its other face, discharges liquid from cylinder 5 into cylinders 6a and 5a of the first apparatus A through the nipple 34, pipe B₁ and nipple 34a of said apparatus A.

It will be seen that these various movements set up: the first action of closing one or other of the compensating valves 25, 25a, the second action of damping out alone the small oscillations, and lastly the third action of combined stabilizing and damping of the larger oscillations.

The described arrangements are, of course, indicated only by way of example, the shapes, substances and dimensions of the elements constituting the damping and stabilizing apparatus, and the constructional details may be modified without departing from the present invention.

What I claim is:

1. In a stabilizing and damping system of the type described, for vehicles comprising a suspended and a nonsuspended part, in combination, at least two similar hydraulic devices arranged on either side of the longitudinal axis of the vehicle and comprising each a hollow body forming an oil tank in its central part and provided with two bores forming two superposed cylinders, means connecting this hollow body to the suspended part of the vehicle, a movable piston in the first of said cylinders, means connecting this piston to the nonsuspended part of the vehicle, connections connecting the outer chambers of the other of said cylinders, two by two and crosswise, with the outer chambers of the corresponding cylinder of the other hydraulic device, said body having channel connections connecting the outer chambers of the first of said cylinders with the second of said cylinders, an adjustable damping valve in the last mentioned connections, stops provided on the bottoms of the second of said cylinders, a closing piston sliding in the bore of the second of said cylinders, stops provided on the ends of said closing piston and adapted to come into contact respectively with one or the other stop of said second cylinder according as to whether the suspended part and the nonsuspended part of the vehicle remain fixed with respect to one another or move relatively to one another with an amplitude greater than a predetermined value, two compensating valves respectively connecting the outer chambers of the first of said cylinders with said oil tank, and of which one or the other is adapted to stop this connection according to the direction of movement of the suspended part with respect to the nonsuspended part of the vehicle.

2. In a stabilizing and damping system of the type described, for vehicles comprising a suspended and a nonsuspended part, in combination, at least two similar hydraulic devices arranged on either side of the longitudinal axis of the vehicle and comprising each a hollow body forming an oil tank in its central part and provided with two bores forming two superposed cylinders, means connecting this hollow body to the suspended part of the vehicle, a movable piston in the first of said cylinders, means connecting this piston to the nonsuspended part of the vehicle, connections connecting the outer chambers of the other of said cylinders, two by two and crosswise, with the outer chambers of the corresponding cylinder of the other hydraulic device, said body having channel connections connecting the outer chambers of the first of said cylinders with the second of said cylinders, and adjustable damping valve in the last mentioned connections, stops provided on the bottoms of the second of said cylinders, fittings in a sound proof substance mounted on these stops, a closing piston sliding in the bore of the second of said cylinders, stops provided on the ends of said closing piston and adapted to come into contact respectively with one or the other stop of said second cylinder according as to whether the suspended part and the nonsuspended part of the vehicle remain fixed with respect to one another or move relatively to one another with an amplitude greater than a predetermined value, two compensating valves respectively connecting the outer chambers of the first of said cylinders with said oil tank, and of which one or the other is adapted to stop this connection according to the direction of movement of the suspended part with respect to the nonsuspended part of the vehicle.

3. In a stabilizing and damping system of the type described, for vehicles comprising a suspended and a nonsuspended part, in combination, at least two similar hydraulic devices arranged on either side of the longitudinal axis of the vehicle and comprising each a hollow body forming an oil tank in its central part and provided with two bores forming two superposed cylinders, means connecting this hollow body to the suspended part of the vehicle, a movable piston in the first of said cylinders, means connecting this piston to the nonsuspended part of the vehicle, connections connecting the outer chambers of the other of said cylinders, two by two and crosswise, with the outer chambers of the corresponding cylinder of the other hydraulic device, said body having channel connections connecting the outer chambers of the first of said cylinders with the second of said cylinders, an adjustable damping valve in the last mentioned connections, stops provided on the bottoms of the second of said cylinders, a closing piston sliding in the bore of the second of said cylinders, stops provided on the ends of said closing piston and adapted to come into contact respectively with one or the other stop of said second cylinder according as to whether the suspended part and the nonsuspended part of the vehicle remain fixed with respect to one another or move relatively to one another with an amplitude greater than a predetermined value, elastic means inserted between one of the bottoms of said second cylinder and the end opposite said closing piston and the elastic force of which is sufficient only for displacing said closing piston, when the suspended and nonsuspended parts of the vehicle are unmovable with respect to one another, in order to bring into contact the stop of the other end of the closing piston with the corresponding stop of the other bottom of said second cylinder, two compensating valves respectively connecting the outer chambers of the first of said cylinders with said oil tank, and of which one or the other is adapted to stop this connection according to the direction of movement of the suspended part with respect to the nonsuspended part of the vehicle.

ANDRÉ ADOLPHE MORTON.